(12) United States Patent
Horiguchi

(10) Patent No.: US 10,594,975 B2
(45) Date of Patent: Mar. 17, 2020

(54) PROJECTOR

(71) Applicant: SEIKO EPSON CORPORATION, Tokyo (JP)

(72) Inventor: Masahiro Horiguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/366,048

(22) Filed: Mar. 27, 2019

(65) Prior Publication Data

US 2019/0306452 A1 Oct. 3, 2019

(30) Foreign Application Priority Data

Mar. 28, 2018 (JP) .................. 2018-061414

(51) Int. Cl.
*H04N 5/74* (2006.01)
*H04N 9/31* (2006.01)
*G02B 27/14* (2006.01)
*G03B 21/20* (2006.01)
*G03B 21/14* (2006.01)

(52) U.S. Cl.
CPC ......... *H04N 5/7441* (2013.01); *G02B 27/141* (2013.01); *G03B 21/142* (2013.01); *G03B 21/2006* (2013.01); *G03B 21/2066* (2013.01); *G03B 21/2073* (2013.01); *H04N 9/3182* (2013.01)

(58) Field of Classification Search
CPC ............... H04N 5/7441; H04N 9/3182; G03B 21/2006; G03B 21/2073; G03B 21/142; G03B 21/2066
See application file for complete search history.

(56) References Cited

U.S. PATENT DOCUMENTS

2015/0035995 A1* 2/2015 Uchiyama ............ H04N 9/3179
348/189
2017/0205695 A1 7/2017 Hu et al.

FOREIGN PATENT DOCUMENTS

JP 2016-57363 A 4/2016
JP 2017-524154 A 8/2017

* cited by examiner

*Primary Examiner* — William C. Dowling
(74) *Attorney, Agent, or Firm* — Oliff PLC

(57) ABSTRACT

A projector includes an illumination system that outputs illumination light containing white light, which is visible light, and infrared light, an image formation section that forms image light from the illumination light, a projection system that projects the image light on a projection surface and radiates the infrared light onto the projection surface, and a detection section that detects a pointing element based on reflected light formed of the radiated infrared light. The image formation section includes a light-exiting-side polarizer that transmits the visible light in such a way that the light-exiting-side polarizer transmits light formed of one polarization component and blocks light formed of another polarization component, and the light-exiting-side polarizer transmits the infrared light in such a way that the light-exiting-side polarizer transmits the two polarization components of the infrared light.

7 Claims, 6 Drawing Sheets

PROJECTOR

BACKGROUND

1. Technical Field

The present invention relates to a projector that projects an image.

2. Related Art

As a projector that projects an image on a projection surface, there is a known projector capable of irradiating the projection surface with infrared light and detecting a pointing element (user's finger, for example) that points at a position on the projection surface based on the reflected infrared light (see JP-A-2016-57363, for example). In the projector (projection apparatus) described in JP-A-2016-57363, visible light for forming an image and infrared light for detecting the pointing element are outputted from a common light source section, and an image formed with the visible light and the infrared light are projected (radiated) through a common projection lens.

In the projector described in JP-A-2016-57363, however, the projection of the image and the radiation of the infrared light are performed in a time division manner, and in the image projection, red light, green light, and blue light are projected also in a time division manner. It is therefore undesirably difficult to ensure a sufficient period for which the infrared light is radiated, that is, radiate the infrared light having an amount necessary for detection of the pointing element.

SUMMARY

A projector according to an aspect of the present application includes an illumination system that outputs illumination light containing visible light and infrared light, an image formation section that forms image light from the illumination light, a projection system that projects the image light on a projection surface and radiates the infrared light onto the projection surface, and a detection section that detects a pointing element with which an instruction is issued on the projection surface based on reflected light formed of the radiated infrared light. The image formation section includes a liquid crystal display device that adjusts a polarization direction of the illumination light on a pixel basis and a first polarizer that is disposed on a light exiting side of the liquid crystal display device and transmits the illumination light outputted from the liquid crystal display device in accordance with the polarization direction of the outputted illumination light. The first polarizer transmits the visible light in such a way that the first polarizer transmits light formed of a first polarization component and blocks light formed of a second polarization component having a polarization direction different from a polarization direction of the first polarization component, and the first polarizer transmits the infrared light in such a way that the first polarizer transmits the first and second polarization components of the infrared light.

In the projector described above, it is desirable that the first polarizer is an organic polarizer made of an organic material.

In the projector described above, it is desirable that the image formation section includes, as the liquid crystal display device, a first liquid crystal display device on which first visible light and the infrared light contained in the illumination light are incident and a second liquid crystal display device on which second visible light that belongs to a wavelength region different from a wavelength region to which the first visible light belongs, that the first polarizer is disposed on a light exiting side of the first liquid crystal display device, that a second polarizer that transmits light formed of the first polarization component of both the visible light and the infrared light and blocks light formed of the second polarization component of both the visible light and the infrared light is disposed on a light exiting side of the second liquid crystal display device, and that the second polarizer is an inorganic polarizer made of an inorganic material.

In the projector described above, it is desirable that the first visible light has a wavelength longer than a wavelength of the second visible light.

In the projector described above, it is desirable that the image formation section includes the first liquid crystal display device on which visible light that belongs to a wavelength region corresponding to red and the infrared light are incident, the second liquid crystal display device on which visible light that belongs to a wavelength region corresponding to green is incident, and a third liquid crystal display device on which visible light that belongs to a wavelength region corresponding to blue is incident, that the first polarizer is disposed on the light exiting side of the first liquid crystal display device, and that the second polarizer is disposed on the light exiting side of each of the second and third liquid crystal display devices.

In the projector described above, it is desirable that the illumination system includes a light source that outputs visible light and a phosphor that produces fluorescence containing infrared light when the visible light outputted from the light source enters and excites the phosphor, and the projector outputs light containing the fluorescence as the illumination light.

In the projector described above, it is desirable that the projector further includes a patterned light formation section that forms patterned light having a predetermined pattern by using the infrared light, and that the projection system radiates the patterned light formed by the patterned light formation section.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

Figure 1:
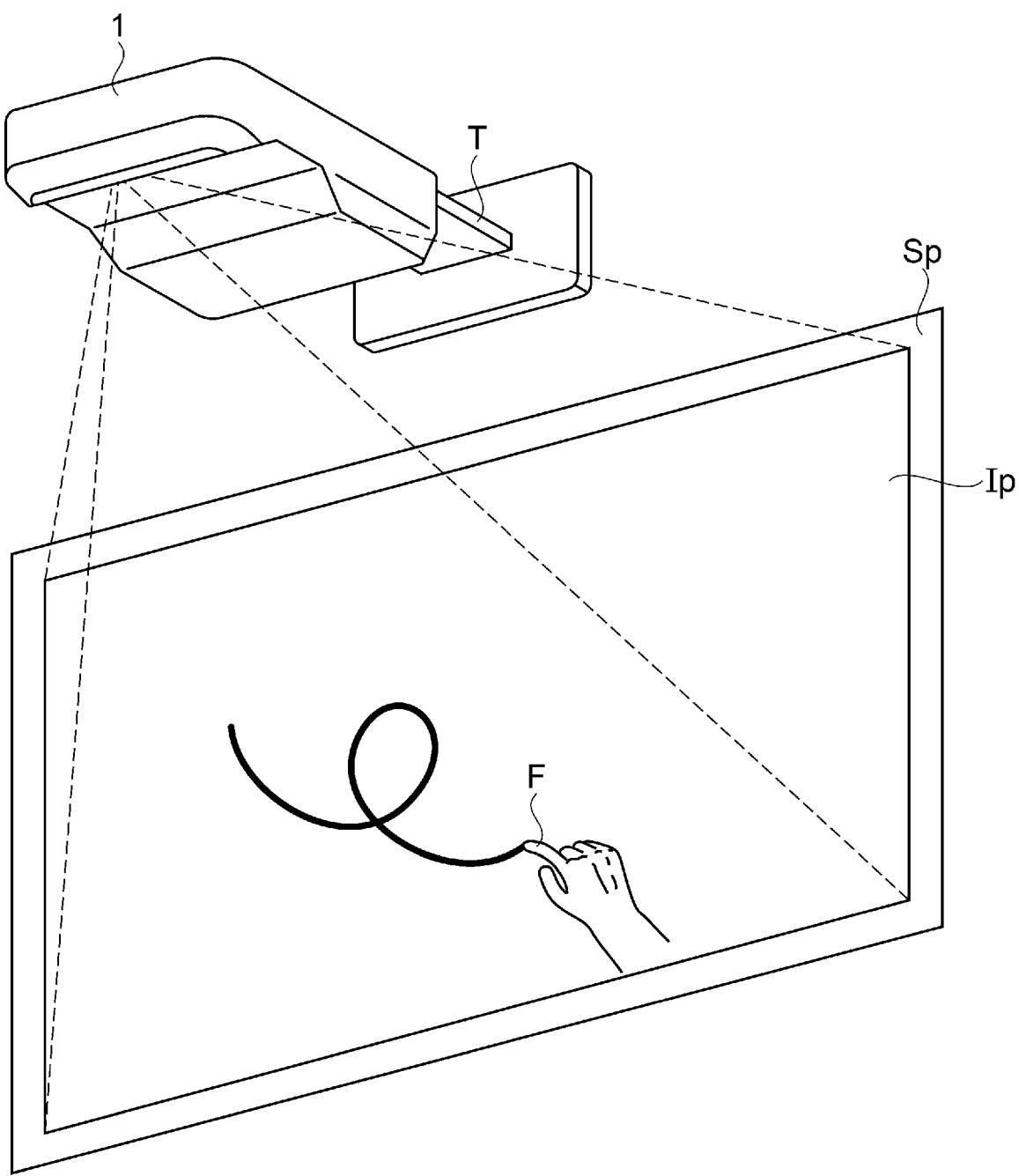
FIG. 1 is a perspective view showing a projector.

FIG. 1 is a perspective view showing a projector 1 according to the present embodiment.

The projector 1 projects an image based on externally inputted image information or image information stored in advance in the projector 1 on a projection surface Sp, as shown in FIG. 1. The projector 1 according to the present embodiment is fixed to a wall surface via a fixing member T and projects an image toward the projection surface Sp disposed on the same wall surface. The projection surface Sp can, for example, be a screen or whiteboard, or the projector 1 may project an image on the wall surface itself.

The projector 1 has the function of irradiating the projection surface Sp with infrared light and can capture an image of a range including an image projected on the projection surface Sp (hereinafter also referred to as "projected image Ip"). The projector 1 captures the infrared light radiated toward the projection surface Sp, and reflected off the pointing element F such as a user's finger and a pointing rod and detects a position on the projection surface Sp that is the position at which the pointing element F points (pointing position). The projector 1 can then display a pointer in the detected pointing position in such a way that the pointer is superimposed on the projected image Ip or display an image formed of a line drawn along the trajectory of the pointing position (hereinafter also referred to as "drawn image") in such a way that the drawn image is superimposed on the projected image Ip.

Figure 2:
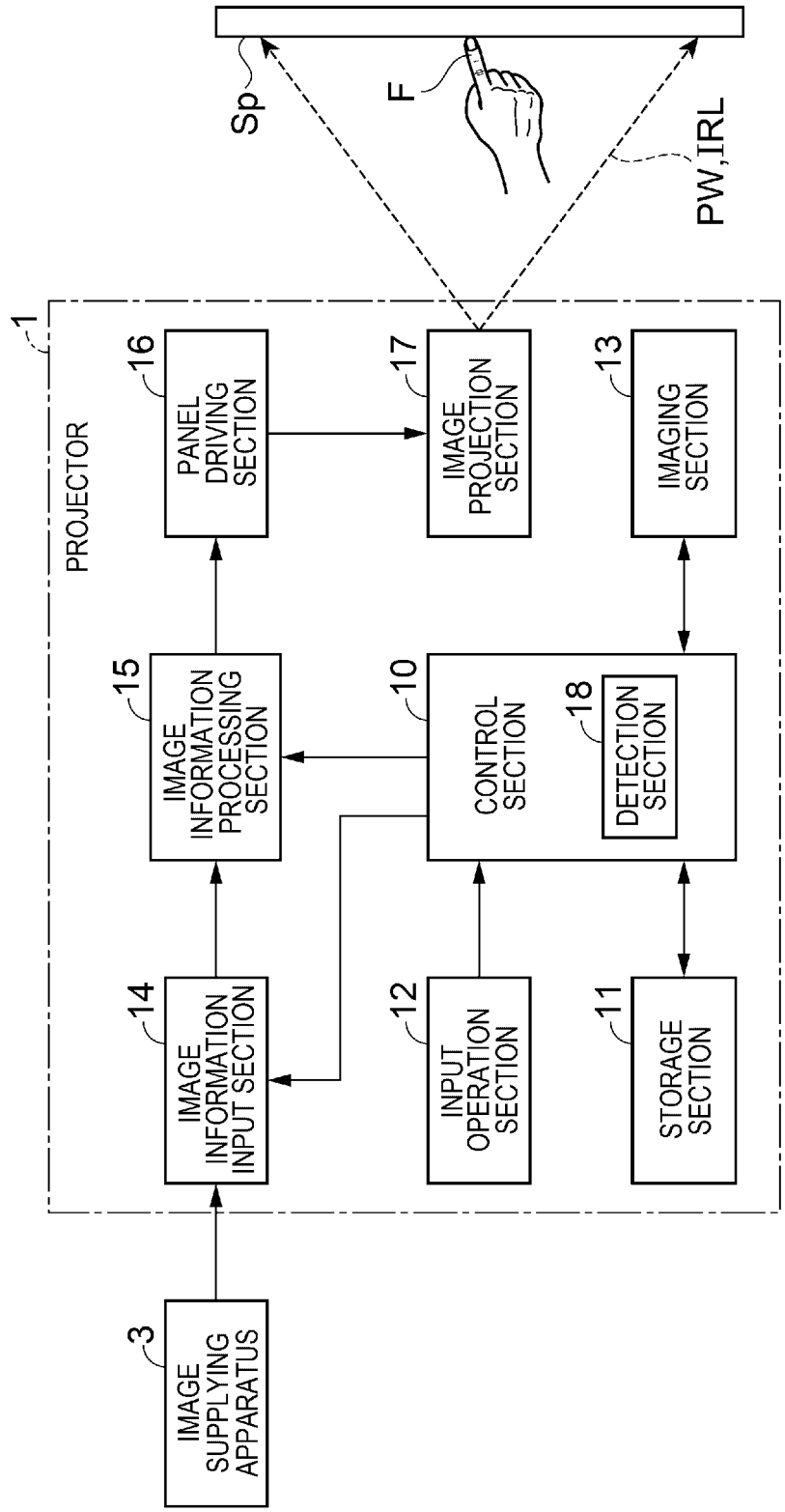
FIG. 2 is a block diagram showing a schematic configuration of the projector.

FIG. 2 is a block diagram showing a schematic configuration of the projector 1.

The projector 1 includes a control section 10, a storage section 11, an input operation section 12, an imaging section 13, an image information input section 14, an image information processing section 15, a panel driving section 16, and an image projection section 17 with the components described above integrated with one another, as shown in FIG. 2. The projector 1 projects an image via the image projection section 17 on the projection surface Sp based on image information inputted to the image information input section 14.

The controller 10 is formed of one or more processors and operates in accordance with a control program stored in the storage section 11 to oversee and control the action of the projector 1.

The storage section 11 is formed, of a memory, such as a RAM (random access memory) and a ROM (read only memory). The RAM is used to temporarily store a variety of data and other pieces of information, and the ROM stores the control program, control data, and other pieces of information for controlling the action of the projector 1. The storage section 11 may further store image information to be projected via the image projection section 17.

The input operation section 12 is provided with a plurality of operation keys that allow the user to issue a variety of instructions to the projector 1. The operation keys provided on the input operation section 12 include a "power key" that switches the state in which the projector 1 is powered on to the state in which the projector 1 is powered off (standby) and vice versa, a "menu key" that causes a menu image for a variety of settings to be displayed, "direction keys" for selecting an item on the menu image, and other keys. When the user operates any of the variety of operation keys on the input operation section 12, the input operation section 12 outputs an operation signal according to the content of the user's operation to the control section 10. A remote control (not shown) that allows the user to remotely operate the projector 1 may be used as the input operation section 12. In this case, the remote control issues an infrared operation signal according to the content of the user's operation, and a remote control signal receiver that is not shown receives the infrared operation signal and transmits the signal to the control section 10.

The imaging section 13 is a camera including a CCD (charge coupled device) sensor, a CMOS (complementary metal oxide semiconductor) sensor, or any other imaging device (not shown). The imaging section 13 includes an infrared transmission filter that absorbs visible light but transmits infrared light and captures the infrared light via the infrared transmission filter. The imaging section 13 captures an image of a range including the projected image Ip on the projection surface Sp under the control of the control section 10 and outputs image information that is the result of the imaging (captured image information) to the control section 10.

The image information input section 14 is connected to an external image supplying apparatus 3, such as a computer and an image reproducing apparatus, and receives image information supplied from the image supplying apparatus 3. The image information input section 14 can instead receive from the control section 10 image information stored in the storage section 11. The image information input section 14 outputs the inputted image information to the image information processing section 15.

The image information processing section 15 performs a variety of types of processing on the image information inputted from the image information input section 14 and outputs the processed image information to the panel driving section 26 under the control of the control section 10. For example, the image information processing section 15 processes the image information as required. That is, the image information processing section 15 adjusts the brightness, the contrast, and other types of image quality, corrects image distortion, superimposes an on-screen display (OSD) image, such as a drawn image and a menu image, on the projected image Ip, and otherwise processes the projected image Ip.

The image information input section 14 and the image information processing section 15 may each be formed of one or more processors and other components or may be formed of a dedicated processing device, such as an application specific integrated circuit (ASIC) and a field programmable gate array (FPGA).

The panel driving section 16 drives liquid crystal panels 71R, 71G, and 71B (see FIG. 3), which are provided in the image projection section 17, based on the image information inputted from the image information processing section 15, to cause the image projection section 17 to generate image light corresponding to the image information.

The image projection section 17 includes an illumination system 20 (see FIG. 3), which outputs illumination light LL, the liquid crystal panels 71R, 71G, and 71B (see FIG. 3), which each serve as a liquid crystal display device that modulates the illumination light LL, and other components. In the image projection section 17, the liquid crystal panels 71R, 71G, and 71B driven by the panel driving section 16 modulate the illumination light LL outputted from the illumination system 20 to form image light PW, which is projected on the projection surface Sp. The illumination light LL in the present embodiment contains infrared light IRL, and the image projection section 17 radiates the infrared light IRL along with the image light PW toward the projection surface Sp.

The control section 10 includes a detection section 18 as a functional block achieved by the control program. The detection section 18 detects the infrared light reflected off the pointing element F out of a captured image based on captured image information inputted from the imaging section 13. The detector 18 uses pattern matching, contour extraction, or any other technique to detect the pointing element F and identifies the position of the front end of the pointing element F as the pointing position. The detection section 18 then controls the image information processing section 15 to cause it, for example, to superimpose a pointer or a drawn image on the projected image Ip based on the identified pointing position.

Figure 3:
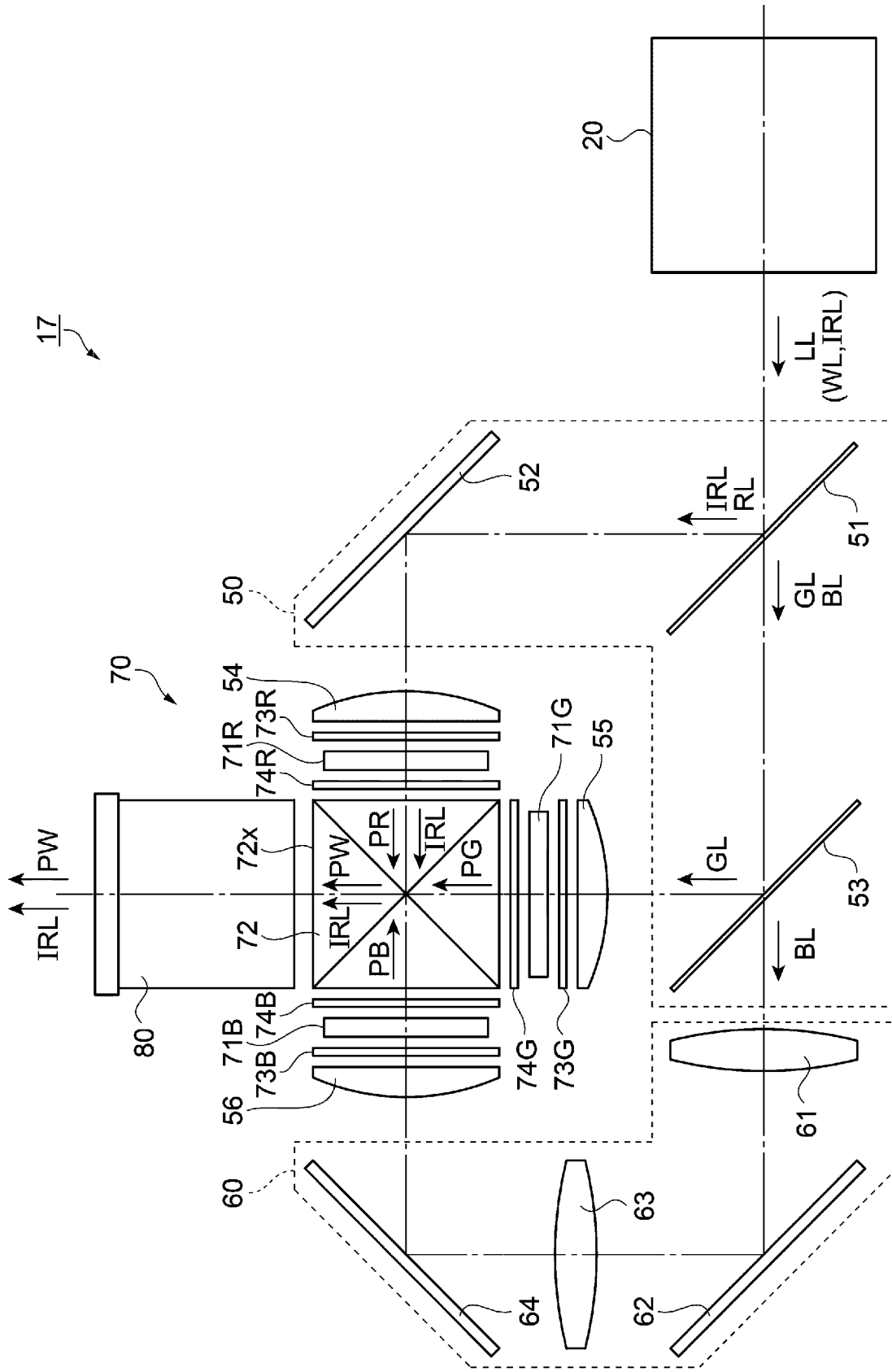
FIG. 3 shows an example of the specific configuration of an image projection section.

FIG. 3 shows an example of the specific configuration of the image projection section 17.

The image projection section 17 includes the illumination system 20, a color separation system 50, a relay system 60, an image formation section 70, and a projection system 80, as shown in FIG. 3.

The illumination system 20 generates the illumination light LL for forming image light and outputs the illumination light LL to the color separation system 50. The illumination light LL is light having an aligned polarization direction achieved by the illumination system 20 and has a uniform luminance distribution. The illumination system 20 outputs, for example, S-polarized light as the illumination light LL. The illumination light LL in the present embodiment contains the infrared light IRL along with white light WL formed of light that belongs to the visible light region. An example of the configuration of the illumination system 20 will be specifically described later.

The color separation system 50 includes a first dichroic mirror 51, a first reflection mirror 52, and a second dichroic mirror 53 and divides the path of the illumination light LL into three paths on a wavelength region basis. Specifically, the color separation system 50 divides the path of the illumination light LL into a path along which visible light that belongs to a wavelength region corresponding to red (red light RL) and the infrared light IRL travel, a path along which visible light that has a wavelength shorter than the wavelength of the red light RL and belongs to a wavelength region corresponding to green (green light GL) travels, and a path along which visible light that has a wavelength shorter than the wavelength of the green light GL and belongs to a wavelength region corresponding to blue (blue light BL) travels.

The first dichroic mirror 51 reflects the red light RL and the infrared light IRL and transmits the green light GL and the blue light BL. The red light RL and the infrared light IRL reflected off the first dichroic mirror 51 are further reflected off the first reflection mirror 52, are parallelized by a paralleling lens 54, and illuminate the liquid crystal panel 71R in the image formation section 70.

The second dichroic mirror 53 transmits the blue light BL and reflects the green light GL. The green light GL reflected off the second dichroic mirror 53 is parallelized by a paralleling lens 55 and illuminates the liquid crystal panel 71G in the image formation section 70. The blue light BL having passed through the second dichroic mirror 53 enters the relay system 60. Having traveled through the relay system 60, the blue light BL is parallelized by a paralleling lens 56 and illuminates the liquid crystal panel 71B in the image formation section 70.

Since the path of the blue light BL is longer than those of the other color light fluxes, and the blue light BL therefore diverge by a greater degree that the other color light fluxes, the relay system 60 is provided to suppress a decrease due to the divergence in illumination efficiency at which the liquid crystal panel 71B is illuminated with the blue light BL. The relay system 60 includes a light-incident-side lens 61, a second reflection mirror 62, a relay lens 63, and a third reflection mirror 64. The blue light BL having entered the relay system 60 passes through the light-incident-side lens 61, which causes the blue light BL to converge in the vicinity of the relay lens 63, and the blue light BL then diverges toward the parallelizing lens 56.

The image formation section 70 modulates the illumination light LL that enters the image formation section 70 to form image light and includes the liquid crystal panel 71R, on which the red light RL and the infrared light IRL are incident, the liquid crystal panel 71G, on which the green light GL is incident, the liquid crystal panel 71B, on which the blue light BL is incident, and a cross dichroic prism 72, which serves as a light combining system. The image formation section 70 further includes light-incident-side polarizers 73R, 73G, and 73B disposed on the light incident side of the liquid crystal panels 71R, 71G, and 71B, respectively, and light-exiting-side polarizers 74R, 74G, and 74B disposed on the light exiting side of the liquid crystal panels 71R, 71G, and 71B, respectively.

The liquid crystal panels 71R, 71G, and 71B each include a pair of transparent substrates that encapsulate a liquid crystal material, and transparent electrodes (pixel electrodes) capable of applying drive voltage to the liquid crystal material on a minute area (pixel) basis are formed in a matrix on the inner surface of each of the transparent substrates. The liquid crystal panels 71R, 71G, and 71B adjust the polarization direction (polarization axis) of the light incident thereon on a pixel basis based on the image information.

The light-incident-side polarizers 73R, 73G, and 73B and the light-exiting-side polarizers 74R, 74G, and 74B, when light is incident thereon, each transmit only polarized light having a polarization direction parallel to the transmission axis of the polarizer. This applied at least to the visible light. The light-incident-side polarizers 73R, 73G, and 73B are so disposed as to transmit polarized light having the aligned polarization direction achieved by the illumination system 20 (S-polarized light, for example). The majority of the color light fluxes radiated toward the liquid crystal panels 71R, 71G, and 71B passes through the light-incident-side polarizers 73R, 73G, and 73B and impinges on the liquid crystal panels 71R, 71G, and 71B. On the other hand, the light-exiting-side polarizers 74R, 74G, and 74B are so disposed that the transmission axes thereof are perpendicular to those of the light-incident-side polarizers 73R, 73G, and 73B.

When the panel driving section 16 (see FIG. 2) applies drive voltage based on the image information to the pixels of the liquid crystal panels 71R, 71G, and 71B, the light fluxes incident on the liquid crystal panels 71R, 71G, and 71B are modulated in accordance with the drive voltage to form polarized light fluxes having polarization directions that vary on a pixel basis. Out of the thus formed polarized light fluxes, visible light fluxes formed of polarization components having polarization directions perpendicular to the transmission axes of the light-exiting-side polarizers 74R, 74G, and 74B (S-polarized light fluxes, for example) are blocked by the light-exiting-side polarizers 74R, 74G, and 74B, whereas visible light fluxes formed of polarization components having polarization directions parallel to the transmission axes of the light-exiting-side polarizers 74R, 74G, and 74B (P-polarized light fluxes, for example) pass through the light-exiting-side polarizers 74R, 74G, and 74B. That is, the liquid crystal panels 71R, 71G, and 71B and the light-exiting-side polarizers 74R, 74G, and 74B transmit the visible light fluxes incident thereon at transmittance factors that vary on a pixel basis in accordance with the image information to form gray-scaled image light fluxes PR, PG, and PB on a color light flux basis. The color image light fluxes PR, PG, and PB having exited out of the light-exiting-side polarizers 74R, 74G, and 74B enter the cross dichroic prism 72.

In the present embodiment, all the light-incident-side polarizers 73R, 73G, and 73B and the light-exiting-side polarizers 74G and 74B, which are disposed in the paths of the green light GL and the blue light BL, are each an inorganic polarizer made of an inorganic material. On the other hand, the light-exiting-side polarizer 74R, which is disposed in the path along which the red light RL, which has a wavelength longer than those of the green light GL and the blue light BL, and the infrared light IRL travel, is an organic polarizer made of an organic material. An inorganic polarizer, in terms of transmission of visible light and infrared light, transmits only light formed of a polarization component having a polarization direction parallel to the transmission axis of the inorganic polarizer but blocks light formed of a polarization component having a polarization direction perpendicular to the transmission axis of the inorganic polarizer. On the other hand, an organic polarizer, in terms of transmission of light that belongs to the visible region, transmits only light formed of a polarization component having a polarization direction parallel to the transmission axis of the organic polarizer but blocks light formed of a polarization component having a polarization direction perpendicular to the transmission axis of the organic polarizer, as in the case of an inorganic polarizer, but the organic polarizer transmits light that belongs to the infrared region irrespective of the polarization direction thereof. That is, an organic polarizer transmits light that belongs to the infrared region in such a way that the organic polarizer transmits not only light formed of a polarization component having a polarization direction parallel to the transmission axis of the organic polarizer but light formed of a polarization component having a polarization direction perpendicular to the transmission axis of the organic polarizer.

Figure 4:
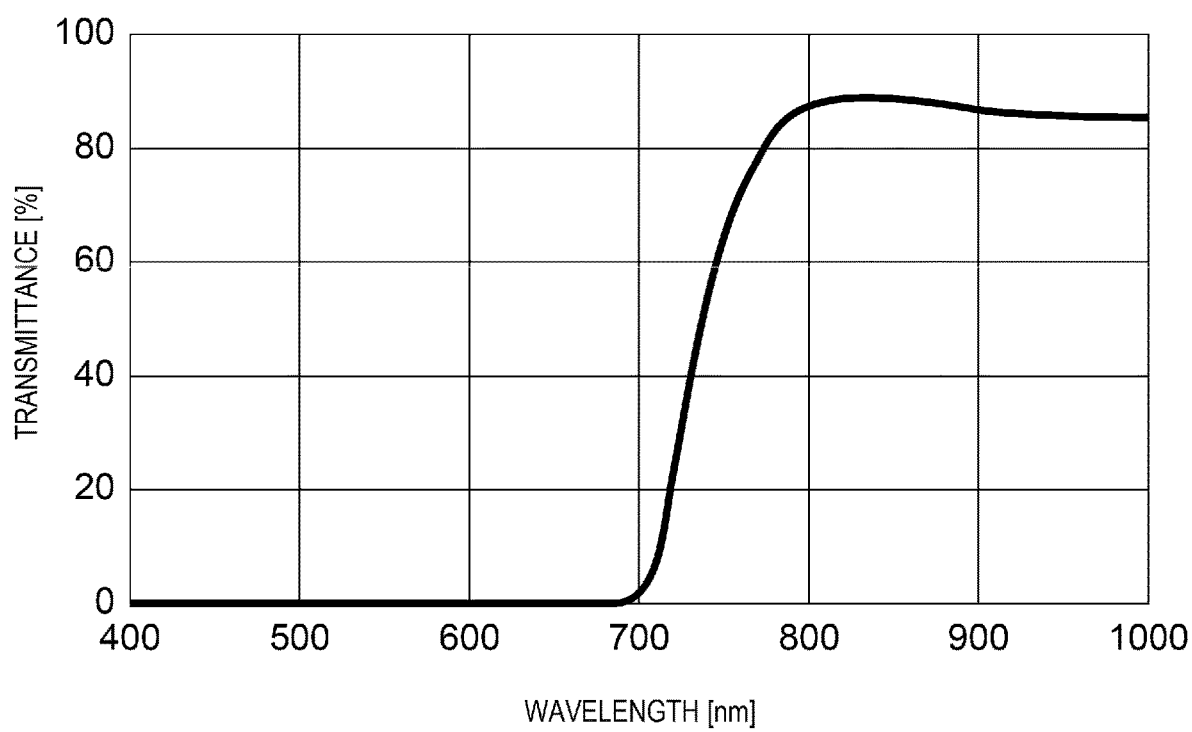
FIG. 4 is a graph showing the relationship between the wavelength of light and the transmittance of the light at which an organic polarizer transmits the light.

FIG. 4 is a graph showing the relationship between the wavelength of light and the transmittance of the light at which an organic polarizer transmits the light and shows the transmittance of light having a polarization direction perpendicular to the transmission axis of the organic polarizer (cross transmittance). In FIG. 4, the horizontal axis represents the wavelength of light, and the vertical axis represents the transmittance of the light.

The transmittance of light that belongs to the visible region (light that belongs to wavelength region from 400 to 700 nm, for example) is roughly 0%, as shown in FIG. 4. That is, visible light having a polarization direction perpendicular to the transmission axis of the organic polarizer is blocked by the organic polarizer. On the other hand, the transmittance of light that belongs to the infrared region (light that belongs to wavelength region from 800 to 1000 nm, for example) has large values higher than or equal to 80%. That is, the majority of infrared light, even light having a polarization direction that is not parallel to the transmission axis of the organic polarizer, passes through the organic polarizer.

As described above, in the present embodiment, since an organic polarizer, which transmits the infrared light IRL irrespective of the polarization direction thereof, is used as the light-exiting-side polarizer 74R disposed in the path of the red light RL and the infrared light IRL, the infrared light IRL incident on the liquid crystal panel 71R passes through the light-exiting-side polarizer 74R and enters the cross dichroic prism 72 irrespective of the polarization direction of the infrared light IRL adjusted by the liquid crystal panel 71R.

Referring back to FIG. 3, in the cross dichroic prism 72, a dielectric multilayer film that reflects the red light RL (image light PR) and the infrared light IRL and a dielectric multilayer film that reflects the blue light BL (image light PB) are provided in a roughly X-letter shape along the interfaces between four right-angle prisms, and the image light fluxes PR, PG, and PB and the infrared light IRL having exited out of the light-exiting-side polarizers 74R, 74G, and 74B are combined with one another at the dielectric multilayer films. The image light PW, which is the combination of the color image light fluxes PR, PG, and PB, and the infrared light IRL exit through a light exiting surfaces 72x and enters the projection system 80.

The projection system 80 includes at least one of a lens and a mirror. The projection system 80 is disposed on the side facing the light exiting surface 72x of the cross dichroic prism 72, projects the image light PW formed by the image formation section 70 on the projection surface Sp, and radiates the infrared light IRL onto the projection surface Sp. As a result, the image light PW displays the projected image Ip on the projection surface Sp, and the same range over which the projected image Ip is displayed is irradiated with the infrared light IRL. Since the light-exiting-side polarizer 74R, which the infrared light IRL enters, is formed of an organic polarizer, which transmits the infrared light IRL irrespective of the polarization direction thereof, as described above, the infrared light IRL is not affected by the modulation performed by the liquid crystal panel 71R, that is, an image to be projected via the liquid crystal panel 71R but is radiated onto the projected image Ip always with a roughly uniform luminance distribution.

A specific configuration of the illumination system 20 will next be described.

Figure 5:
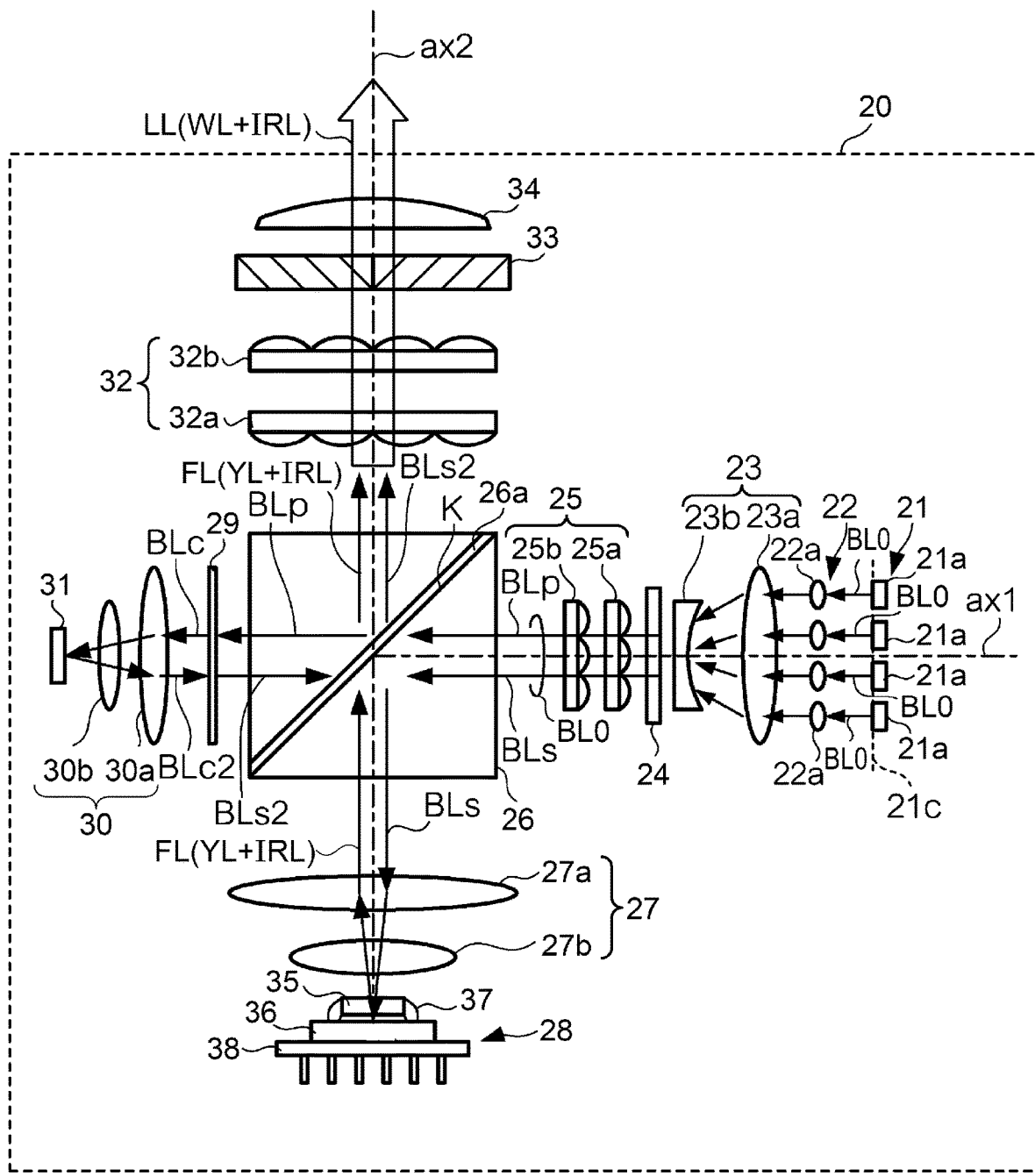
FIG. 5 shows an example of the specific configuration of an illumination system.

FIG. 5 shows an example of the specific configuration of the illumination system 20.

The illumination system 20 includes an array light source 21, a collimator system 22, an afocal system 23, a retardation film 24, a homogenizer system 25, a prism 26 including a polarization separation element 26a, a pickup system 27, a light emitting element 28, a retardation film 29, a second pickup system 30, a diffusive reflection element 31, an optical integration system 32, a polarization conversion element 33, and a superimposing lens 34, as shown in FIG. 5.

Among the constituent elements described above, the array light source 21, the collimator system 22, the afocal system 23, the retardation film 24, the homogenizer system 25, the prism 26, the retardation film 29, the second pickup system 30, and the diffusive reflection element 31 are sequentially arranged along an optical axis ax1 in such a way that the optical centers of the elements coincide with the optical axis ax1. On the other hand, the light emitting element 28, the pickup system 27, the prism 26, the optical integration system 32, the polarization conversion element 33, and the superimposing lens 34 are sequentially arranged along an optical axis ax2 in such a way that the optical centers of the elements coincide with the optical axis ax2. The positional relationship between the optical axis ax1 and the optical axis ax2 are so set that the two axes are present in the same plane and perpendicular to each other.

The array light source 21 includes a plurality of semiconductor lasers 21a, which each serve as a solid-state light source. The plurality of semiconductor lasers 21a are arranged in an array in a plane 21c perpendicular to the optical axis ax1. In the present embodiment, the semiconductor lasers 21a each output a blue light beam BL0, which is visible light that belongs to a wavelength region corresponding to blue and is formed of S-polarized light.

The blue light beams BL0 outputted from the array light source 21 enter the collimator system 22. The collimator system 22 converts the blue light beams BL0 outputted from the array light source 21 into a parallelized light flux. The collimator system 22 includes, for example, a plurality of collimator lenses 22a arranged in an array. The plurality of collimator lenses 22a are disposed in correspondence with the plurality of semiconductor lasers 21a.

The blue light BL0, to which the blue light beams BL0 having passed through the collimator system 22 are converted to the parallel light beams, enters the afocal system 23. The afocal system 23 adjusts the light flux diameter of the blue light BL0. The afocal system 23 includes, for example, two afocal lenses 23a and 23b.

The blue light BL0 having passed through the afocal system 23 and therefore having the adjusted light flux diameter enters the retardation film 24. The retardation film 24 is formed of a half wave plate associated with the wavelength of the blue light BL0. The optic axis of the retardation film 24 intersects the polarization axis of the blue light BL0 that enters the retardation film 24. The optic axis of the retardation film 24 may be the fast axis or the slow axis of the retardation film 24.

The blue light BL0 is initially coherent S-polarized light, and the polarization axis of the blue light BL0 intersects the optic axis of the retardation film 24. Therefore, when the blue light BL0 passes through the retardation film 24, part of the S-polarized light is converted into P-polarized light. As a result, the blue light BL0 having passed through the retardation film 24 has an S-polarized component BLs and a P-polarized component BLp mixed with each other at a predetermined ratio.

The blue light BL0 partially converted by the retardation film 24 into P-polarized light enters the homogenizer system 25. The homogenizer system 25 converts the optical intensity distribution of the blue light BL0, for example, into a uniform optical intensity distribution called a top-hat distribution. The homogenizer system 25 includes, for example, two multi-lens arrays 25a and 25b.

The blue light BL0 having exited out of the homogenizer system 25 enters the prism 26. The prism 26 is formed, for example, of a dichroic prism having wavelength selectivity. The prism 26 has an inclining surface K, which inclines by 45° with respect to the optical axis ax1. The inclining surface K also inclines by 45° with respect to the optical axis ax2. The prism 26 is so disposed that the intersection of the optical axes ax1 and ax2, which are perpendicular to each other, coincides with the optical center of the inclining surface K. The prism 26 formed of a dichroic prism may be replaced with a flat-plate-shaped dichroic mirror having surfaces parallel to each other.

The polarization separation element 26a having wavelength selectivity is provided on the inclining surface K. The polarization separation element 26a has a polarization separation function of separating the blue light BL0 into the S-polarized component BLs and the P-polarized component BLp. Specifically, the polarization separation element 26a reflects the S-polarized component BLs of the blue light BL0 and transmits the P-polarized component BLp of the blue light BL0. The S-polarized component BLs reflected off the polarization separation element 26a is used to excite a phosphor, and the S-polarized component BLs of the blue light BL0 is therefore also called excitation light BLs in the following description. Further, the P-polarized component BLp having passed through the polarization separation element 26a is also called blue light BLp.

The S-polarized excitation light BLs having exited out of the polarization separation element 26a enters the pickup system 27. The pickup system 27 collects the excitation light BLs and directs the collected excitation light BLs toward a phosphor layer 35 of the light emitting element 28. The pickup system 27 includes, for example, two pickup lenses 27a and 27b.

The excitation light BLs having exited out of the pickup system 27 enters the light emitting element 28. The light emitting element 28 includes the phosphor layer 35, which serves as a phosphor, and a substrate 36, which supports the phosphor layer 35. When the excitation light BLs enters the phosphor layer 35, the phosphor contained in the phosphor layer 35 is excited with the excitation light BLs and produces fluorescence FL having a wavelength different from the wavelength of the excitation light BLs. The fluorescence FL produced in the present embodiment contains visible light that belongs to a wavelength region corresponding to yellow (yellow light) and the infrared light IRL.

In the light emitting element 28, the phosphor layer 35 is fixed to the substrate 36 via an adhesive 37, which is provided between the side surface of the phosphor layer 35 and the substrate 36, with a surface of the phosphor layer 35 that is the surface opposite the side on which the excitation light BLs is incident being in contact with the substrate 36. A heat sink 38, which dissipates heat from the phosphor layer 35, is provided on a surface of the substrate 36 that is the surface opposite the side on which the phosphor layer 35 is provided.

The fluorescence FL emitted from the phosphor layer 35 is non-polarized light having polarization directions that are not aligned with one another. After passing through the pickup system 27, the fluorescence FL that is still non-polarized light enters the polarization separation element 26a. The polarization separation element 26a transmits light that belongs to a wavelength region different from the wavelength region to which the blue light BL0 outputted from the semiconductor lasers 21a belongs irrespective of the polarization state of the light. The fluorescence FL therefore passes through the polarization separation element 26a and travels toward the optical integration system 32.

On the other hand, the P-polarized blue light BLp having exited out of the polarization separation element 26a enters the retardation film 29 formed of a quarter wave plate. The P-polarized blue light BLp having exited out of the polarization separation element 26a is converted by the retardation film 29 into circularly polarized blue light BLc, which then enters the second pickup system 30.

The second pickup system 30 collects the blur light BLc and directs the collected blue light BLc toward the diffusive reflection element 31. The second pickup system 30 includes, for example, two pickup lenses 30a and 30b.

The diffusive reflection element 31 diffusively reflects the blue light BLc having exited out of the second pickup system 30 toward the polarization separation element 26a. In particular, the diffusive reflection element 31 is preferably an element that reflects the blue light BLc incident on the diffusive reflection element 31 in a Lambertian reflection scheme. In the illumination system 20, using the thus configured diffusive reflection element 31 allows diffusive reflection of the blue light BLc to produce blue light BLc2 having a uniform illuminance distribution.

The blue light BLc2 diffusively reflected off the diffusive reflection element 31 enters the retardation film 29 again, which converts the circularly polarized blue light BLc2 into S-polarized blue light BLs2. The S-polarized blue light BLs2 is reflected off the polarization separation element 26a and travels toward the optical integration system 32.

The blue light BLs2 having been reflected off the polarization separation element 26a and the fluorescence FL having passed through the polarization separation element 26a exit out of the polarization separation element 26a in the same direction. The polarization separation element 26a also thus has the function of a light combining element that combines the blue light BLs2 and the fluorescence FL. The blue light BLs2 and yellow light YL contained in the fluorescence FL are thus combined with each other into the white light WL, and the white light WL and the infrared light IRL contained in the fluorescence FL exit as the illumination light LL.

The illumination light LL having exited out of the polarization separation element 26a enters the optical integration system 32. The optical integration system 32 divides the illumination light LL into a plurality of narrow light fluxes. The optical integration system 32 includes, for example, a first lens array 32a and a second lens array 32b. The first lens array 32a and the second lens array 32b each include a plurality of microlenses arranged in an array.

The illumination light LL having exited out of the optical integration system 32 (plurality of narrow light fluxes) enters the polarization conversion element 33. The polarization conversion element 33 has the function of aligning the polarization directions of the illumination light LL with one another. The polarization conversion element 33 includes, for example, polarization separation films, retardation films, and mirrors. The polarization conversion element 33, which aligns the polarization directions of the fluorescence FL, which is non-polarized light, with the polarization direction of the S-polarized blue light BLs2, converts, for example, the P-polarized light component contained in the illumination light LL into the S-polarized light component.

The illumination light LL having passed through the polarization conversion element 33 and therefore having the aligned polarization direction enters the superimposing lens 34. The superimposing lens 34 superimposes the plurality of narrow light fluxes having exited out of the polarization conversion element 33 on one another on a target to be illuminated. The liquid crystal panels 71R, 71G, and 71B, which are each the target to be illuminated, are therefore uniformly illuminated with the illumination light LL having exited out of the superimposing lens 34.

The white light WL contained in the illumination light LL is separated into the three color light fluxes and then modulated by the liquid crystal panels 71R, 71G, and 71B, and parts of the modulated light fluxes are blocked by the light-exiting-side polarizers 74R, 74G, and 74B, so that the remainder forms the image light PW, as described above. The image light PW is then projected via the projection system 80 on the projection surface Sp and displayed as the projected image Ip. The majority of the infrared light IRL contained in the illumination light LL passes through the light-exiting-side polarizer 74R, is uniformly radiated via the projection system 80 onto the projection surface Sp, and is used to detect the pointing element F. That is, the projector 1 according to the present embodiment needs no new configuration for radiating the infrared light IRL separate from the configuration for projecting the image light PW but can uniformly radiate the infrared light IRL having an amount necessary for the detection of the pointing element F.

As described above, the projector 1 according to the present embodiment can provide the following effects.

(1) According to the present embodiment, since the image formation section 70 forms the image light PW from the illumination light LL by using the light-exiting-side polarizer 74R, which transmits the infrared light IRL irrespective of the polarization direction thereof, the infrared light IRL contained in the illumination light LL can be radiated along with the image light PW onto the projection surface Sp, whereby the infrared light IRL having an amount necessary for the detection of the pointing element F is readily radiated.

(2) According to the present embodiment, since an organic polarizer is used as the light-exiting-side polarizer 74R, the property required for the light-exiting-side polarizer 74R, that is, the property that allows transmission of one polarization component of visible light but blockage of the other polarization component thereof and transmission of both the polarization components of the infrared light can be readily achieved.

(3) According to the present embodiment, an organic polarizer is used as the light-exiting-side polarizer 74R disposed in the path of the red light RL and the infrared light IRL, and an inorganic polarizer is used as each of the light-exiting-side polarizers 74G and 74B disposed on the other paths. In general, an inorganic polarizer excels in light resistance as compared with an organic polarizer, whereby a decrease in light resistance can be suppressed as compared with a case where an organic polarizer is used also as each of the light-exiting-side polarizers 74G and 74B.

(4) According to the present embodiment, the red light RL, which is incident along with the infrared light IRL on the light-exiting-side polarizer 74R, which is an organic polarizer, has a wavelength longer than those of the green light GL and the blue light BL. In general, degradation of an organic polarizer is more likely to worsen when irradiated with light having a relatively short wavelength than when irradiated with light having a relatively long wavelength. Therefore, as compared with a case where the light incident along with the infrared light IRL on an organic polarizer is the green light GL or the blue light BL, the degradation of the organic polarizer can be suppressed.

(5) According to the present embodiment, since the illumination system 20 includes the phosphor layer 35, which produces the fluorescence FL containing the infrared light IRL when the excitation light BLs, which is visible light, enters the phosphor layer 35, the illumination light LL containing the infrared light IRL can be readily generated from the light from a light source that outputs visible light.

In the embodiment described above, the liquid crystal panel 71R corresponds to a first liquid crystal display device, the liquid crystal panel 71G corresponds to a second liquid crystal display device, and the liquid crystal panel 71B corresponds to a third liquid crystal display device. The light-exiting-side polarizer 74R disposed on the light exiting side of the liquid crystal panel 71R corresponds to a first polarizer, and the light-exiting-side polarizers 74G and 74B disposed on the light exiting side of the liquid crystal panels 71G and 71B each correspond to a second polarizer. The red light RL corresponds to first visible light, and the green light GL corresponds to second visible light. For example, the P-polarized component corresponds to a first polarization component, and the S-polarized component corresponds to a second polarization component.

Variations

The embodiment described above may be changed as follows.

In the embodiment described above, the image projection section 17 radiates the infrared light IRL with a roughly uniform luminance distribution to a range of the projection surface Sp that is the range over which the projected image Ip is projected, but not necessarily. For example, the image projection section 17 may form patterned light having a predetermined pattern by using the infrared light IRL and radiate the formed patterned light. The pattern of the patterned light can, for example, be a stripe pattern, a lattice pattern, and a pattern having a large number of dots. Radiating such patterned light toward the projection surface Sp allows three-dimensional detection of the position and shape of the pointing element F based on the patterned light reflected off the pointing element F, whereby a projector 1 capable of issuing a variety of instructions via the pointing element F can be achieved.

Figure 6:
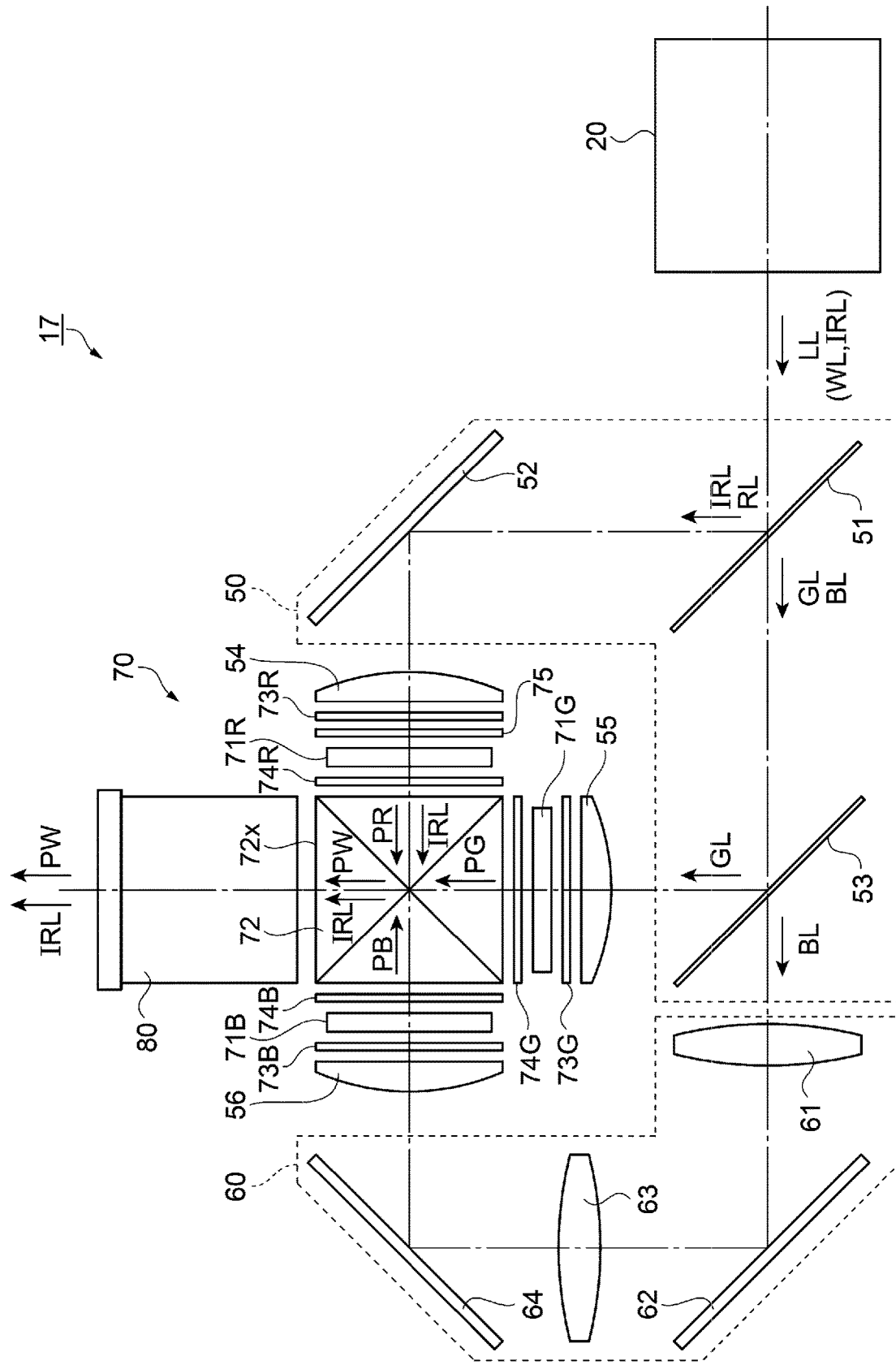
FIG. 6 shows an example of the specific configuration of an image projection section according to a variation.

To form patterned light from the infrared light IRL, an optical element 75 for forming patterned light may be disposed in the vicinity of the liquid crystal panel 71R (in the vicinity of light incident side thereof), on which the infrared light IRL is incident, for example, as shown in FIG. 6. The optical element 75 has a pattern in the form of a film that transmits the visible light (red light RL) and reflects the infrared light IRL. When the red light RL and the infrared light IRL pass through the optical element 75, the infrared light IRL can form patterned light without affecting the formation of the image light PR from the red light RL. In this example, the optical element 75 corresponds to a patterned light formation section.

In the embodiment described above, the illumination system 20 is so configured that part of the blue light BL0 outputted from the semiconductor lasers 21a excites the phosphor to generate the illumination light LL containing the infrared light IRL, but not necessarily, as long as the illumination system 20 can output illumination light LL containing the visible light (white light WL) and the infrared light IRL. For example, the illumination system 20 may include LEDs (light emitting diodes) or a discharge-type light source lamp as the light source.

In the embodiment described above, the light-exiting-side polarizer 74R formed of an organic polarizer is disposed in the path of the red light RL, and the infrared light IRL is caused to travel along the same path along which the red light RL travels, but not necessarily. For example, an organic polarizer may be disposed in the path of the green light GL or the blue light BL, and the infrared light IRL may be caused to travel along the same path along which the green light GL or the blue light BL travels. To suppress degradation of an organic polarizer due to light incident thereon, however, it is desirable to dispose the organic polarizer in the path of light having a long wavelength. That is, it is more desirable to dispose an organic polarizer in the path of the green light GL than in the path of the blue light BL, and it is more desirable to dispose an organic polarizer in the path of the red light RL than in the path of the green light GL.

In the embodiment described above, an organic polarizer is only used to form the light-exiting-side polarizer 74R in the path along which the infrared light IRL travels, and an inorganic polarizer is used to form each of the other light-exiting-side polarizers 74G and 74B and all the light-incident-side polarizers 73R, 73G, and 73B, but not necessarily. That is, an organic polarizer may be used to form a polarizer other than the light-exiting-side polarizer 74R in the path along which the infrared light IRL travels.

In the embodiment described above, the configuration in which the three liquid crystal panels 71R, 71G, and 71B are provided on a color light basis is presented, but not necessarily. For example, a configuration in which a single liquid crystal panel modulates a plurality of color light fluxes in a time division manner may be employed.

Contents derived from the embodiment will be described below.

A projector includes an illumination system that outputs illumination light containing visible light and infrared light, an image formation section that forms image light from the illumination light, a projection system that projects the image light on a projection surface and radiates the infrared light onto the projection surface, and a detection section that detects a pointing element with which an instruction is issued on the projection surface based on reflected light formed of the radiated infrared light. The image formation section includes a liquid crystal display device that adjusts the polarization direction of the illumination light on a pixel basis and a first polarizer that is disposed on the light exiting side of the liquid crystal display device and transmits the illumination light outputted from the liquid crystal display device in accordance with the polarization direction of the outputted illumination light. The first polarizer transmits the visible light in such a way that the first polarizer transmits light formed of a first polarization component and blocks light formed of a second polarization component having a polarization direction different from the polarization direction of the first polarization component, and the first polarizer transmits the infrared light in such a way that the first polarizer transmits the first and second polarization components of the infrared light.

According to the configuration described above, since the image formation section forms image light from the illumination light by using the first polarizer, which transmits both the first and second polarization components of the infrared light, the infrared light contained in the illumination light can be radiated along with the image light onto the projection surface, whereby infrared light having an amount of necessary for detection of the pointing element is readily radiated.

In the projector described above, it is desirable that the first polarizer is an organic polarizer made of an organic material.

According to the configuration described above, since the first polarizer is an organic polarizer, the property required for the first polarizer, that is, the property that allows transmission of the first polarization component of visible light but blockage of the second polarization component thereof and transmission of both the first and second polarization components of the infrared light can be readily achieved.

In the projector described above, it is desirable that the image formation section includes, as the liquid crystal display device, a first liquid crystal display device on which first visible light and the infrared light contained in the illumination light are incident and a second liquid crystal display device on which second visible light that belongs to a wavelength region different from the wavelength region to which the first visible light belongs, that the first polarizer is disposed on the light exiting side of the first liquid crystal display device, that a second polarizer that transmits light formed of the first polarization component of both the visible light and the infrared light and blocks light formed of the second polarization component of both the visible light and the infrared light is disposed on the light exiting side of the second liquid crystal display device, and that the second polarizer is an inorganic polarizer made of an inorganic material.

According to the configuration described above, an organic polarizer is disposed on the light exiting side of the first liquid crystal display device, on which the infrared light is incident, and an inorganic polarizer is disposed on the light exiting side of the second liquid crystal display device, on which no infrared light is incident. In general, an inorganic polarizer excels in light resistance as compared with an organic polarizer, whereby a decrease in light resistance can be suppressed as compared with a case where an organic polarizer is used as each of the two polarizers.

In the projector described above, it is desirable that the first visible light has a wavelength longer than the wavelength of the second visible light.

According to the aspect described above, the first visible light, which is incident along with the infrared light on the first liquid crystal display device and the first polarizer, has a wavelength longer than the wavelength of the second visible light, which is incident on the second liquid crystal display device. In general, degradation of an organic polarizer is more likely to worsen when irradiated with light having a relatively short wavelength than when irradiated with light having a relatively long wavelength. The degradation of the first polarizer, which is an organic polarizer, can therefore be suppressed, as compared with a case where the first visible light has a wavelength shorter than the wavelength of the second visible light.

In the projector described above, it is desirable that the image formation section includes the first liquid crystal display device on which visible light that belongs to a wavelength region corresponding to red and the infrared light are incident, the second liquid crystal display device on which visible light that belongs to a wavelength region corresponding to green is incident, and a third liquid crystal display device on which visible light that belongs to a wavelength region corresponding to blue is incident, that the first polarizer is disposed on the light exiting side of the first liquid crystal display device, and that the second polarizer is disposed on the light exiting side of each of the second and third liquid crystal display devices.

According to the aspect described above, the same effects provided by the projector described above can be provided.

In the projector described above, it is desirable that the illumination system includes a light source that outputs visible light and a phosphor that produces fluorescence containing infrared light when the visible light outputted from the light source enters and excites the phosphor, and that the projector outputs light containing the fluorescence as the illumination light.

According to the aspect described above, illumination light containing infrared light can be readily generated from the light from the light source that outputs visible light.

In the projector described above, it is desirable that the projector further includes a patterned light formation section that forms patterned light having a predetermined pattern by using the infrared light, and that the projection system radiates the patterned light formed by the patterned light formation section.

According to the configuration described above, since patterned light formed of infrared light is radiated from the projection system, the position and shape of a pointing element can be three-dimensionally detected based on the patterned light reflected off the pointing element, whereby a projector capable of issuing a variety of instructions via the pointing element can be achieved.

The entire disclosure of Japanese Patent Application No. 2018-061414, filed Mar. 28, 2018 is expressly incorporated by reference herein.

What is claimed is:

1. A projector comprising:
an illumination system that outputs illumination light containing visible light and infrared light;
an image formation section that forms image light from the illumination light;
a projection system that projects the image light on a projection surface and radiates the infrared light onto the projection surface; and
a detection section that detects a pointing element with which an instruction is issued on the projection surface based on reflected light formed of the radiated infrared light,
wherein the image formation section includes a liquid crystal display device that adjusts a polarization direction of the illumination light on a pixel basis and a first polarizer that is disposed on a light exiting side of the liquid crystal display device and transmits the illumination light outputted from the liquid crystal display device in accordance with the polarization direction of the outputted illumination light, and
the first polarizer transmits the visible light in such a way that the first polarizer transmits light formed of a first polarization component and blocks light formed of a second polarization component having a polarization direction different from a polarization direction of the first polarization component, and the first polarizer transmits the infrared light in such a way that the first polarizer transmits the first and second polarization components of the infrared light.

2. The projector according to claim 1,
wherein the first polarizer is an organic polarizer made of an organic material.

3. The projector according to claim 2,
wherein the image formation section includes, as the liquid crystal display device, a first liquid crystal display device on which first visible light and the infrared light contained in the illumination light are incident and a second liquid crystal display device on which second visible light that belongs to a wavelength region different from a wavelength region to which the first visible light belongs,
the first polarizer is disposed on a light exiting side of the first liquid crystal display device,
a second polarizer that transmits light formed of the first polarization component of both the visible light and the infrared light and blocks light formed of the second polarization component of both the visible light and the infrared light is disposed on a light exiting side of the second liquid crystal display device, and
the second polarizer is an inorganic polarizer made of an inorganic material.

4. The projector according to claim 3,
wherein the first visible light has a wavelength longer than a wavelength of the second visible light.

5. The projector according to claim 4,
wherein the image formation section includes the first liquid crystal display device on which visible light that belongs to a wavelength region corresponding to red and the infrared light are incident, the second liquid crystal display device on which visible light that belongs to a wavelength region corresponding to green is incident, and a third liquid crystal display device on which visible light that belongs to a wavelength region corresponding to blue is incident, the first polarizer is disposed on the light exiting side of the first liquid crystal display device, and the second polarizer is disposed on the light exiting side of each of the second and third liquid crystal display devices.

6. The projector according to claim 1, wherein the illumination system includes a light source that outputs visible light and a phosphor that produces fluorescence containing infrared light when the visible light outputted from the light source enters and excites the phosphor, and the projector outputs light containing the fluorescence as the illumination light.

7. The projector according to claim 1, further comprising a patterned light formation section that forms patterned light having a predetermined pattern by using the infrared light, wherein the projection system radiates the patterned light formed by the patterned light formation section.

\* \* \* \* \*